United States Patent [19]

Soltz

[11] Patent Number: 4,821,569

[45] Date of Patent: Apr. 18, 1989

[54] PARASITIC ECHO PULSE REJECTOR FOR ULTRASONIC LIQUID LEVEL METER

[75] Inventor: Daniel J. Soltz, Norristown, Pa.

[73] Assignee: Fischer & Porter Co., Warminster, Pa.

[21] Appl. No.: 114,857

[22] Filed: Oct. 30, 1987

[51] Int. Cl.⁴ .................... G01F 23/28; G01S 15/08
[52] U.S. Cl. ............................ 73/290 V; 73/861.26; 367/908
[58] Field of Search .................. 73/290 V; 367/908

[56] References Cited

U.S. PATENT DOCUMENTS

| | | | |
|---|---|---|---|
| 3,090,224 | 5/1963 | Rankin. | |
| 3,996,798 | 12/1976 | Vander Heyden | 73/195 |
| 4,144,517 | 3/1979 | Baumoe | 73/290 V X |
| 4,183,244 | 1/1980 | Kohno et al. . | |
| 4,470,299 | 9/1984 | Soltz | 73/290 V |
| 4,523,465 | 6/1985 | Fasching et al. | 367/908 |
| 4,578,997 | 4/1986 | Soltz | 73/290 V |
| 4,675,854 | 6/1987 | Lau | 367/908 |
| 4,700,569 | 10/1987 | Michalski et al. | 73/290 V |

OTHER PUBLICATIONS

"Taking the Spikes Out of Ultrasonic Flow Measurement", Daniel J. Soltz, Mar. 1984, Pollution Engineering.

"Digital Circuits and Microprocesors", Herbert Taub, McGraw Hill Book Co. p. 331 ("Contollers").

Primary Examiner—Daniel M. Yasich
Attorney, Agent, or Firm—Michael Ebert

[57] ABSTRACT

An ultrasonic echo-ranging meter for measuring the changing level of liquid in a tank or open channel, the meter including a transducer at a raised position above the liquid surface. Pulses of ultrasonic energy transmitted by the transducer are directed toward the liquid surface and reflected thereby to produce main echo pulses that are picked up by the same transducer. The round trip transmit time of the pulse energy in the gaseous medium above the liquid depends on the distance between the transducer and the liquid surface, this time being measured to provide a reading of liquid level. Also intercepted by the transducer are parasitic echo pulses originating from reflecting wall surfaces and other obstacles in the vicinity of the tank or channel, which parasitic pulses may be confused with the main echo pulses and result in an erroneous reading. In order to reject these parasitic pulses without appreciably slowing down the response time of the meter to liquid level changes, means are provided that discriminate between parasitic and main echo pulses and act to render the meter insensitive to parasitic pulses.

9 Claims, 1 Drawing Sheet

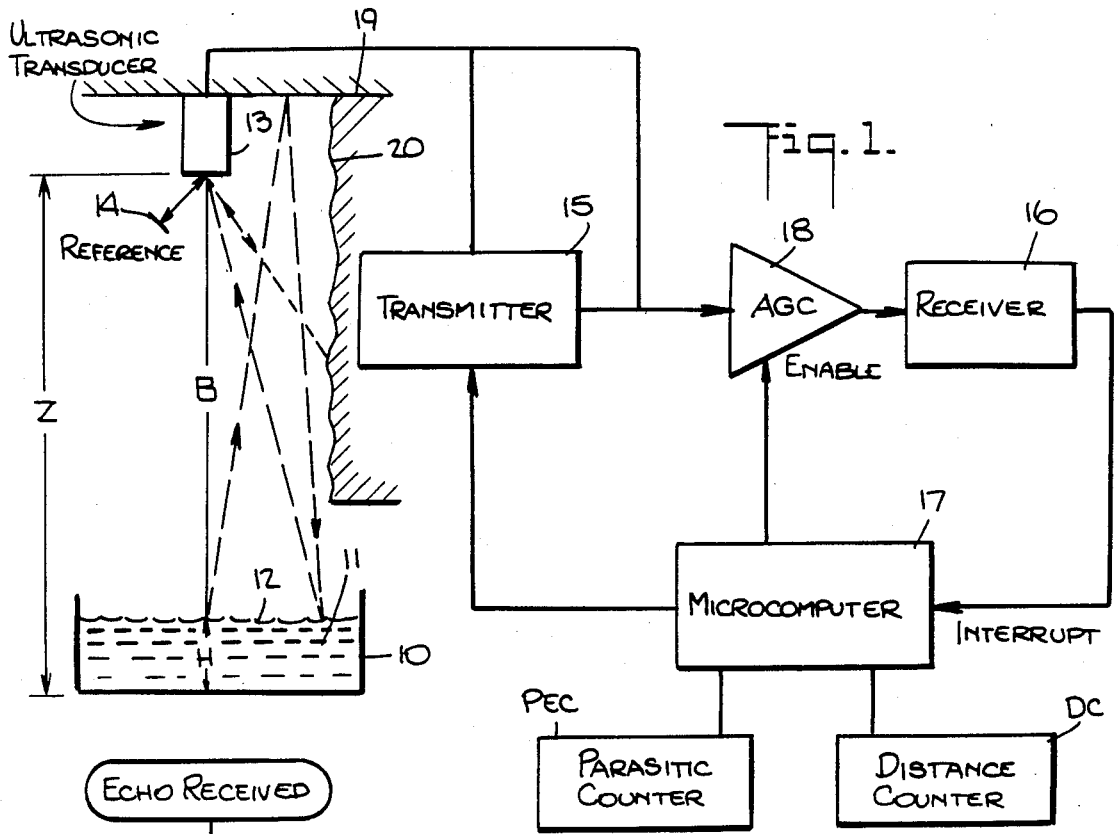

PARASITIC ECHO PULSE REJECTOR FOR ULTRASONIC LIQUID LEVEL METER

BACKGROUND OF INVENTION

1. Field of Invention

This invention relates generally to ultrasonic liquid-level meters of the echo-ranging type, and in particular to a meter adapted to reject parasitic echo pulses derived from reflective surfaces other than the liquid surface whose level is to be measured whereby the meter is responsive only to main echo pulses reflected from the liquid surface, thereby avoiding erroneous readings.

2. Status of Prior Art

In an ultrasonic echo-ranging meter, pulses of ultrasonic energy transmitted by a transducer placed above the surface of a liquid in a tank or open channel are reflected thereby to produce echo pulses which are picked up by the same transducer. By determining the round trip transit time of the pulse energy in the gaseous medium above the liquid surface, which transit time depends on the distance between the transducer and the surface, one is able to provide a reading of liquid level.

The accuracy of an ultrasonic liquid level meter of the echo-ranging type is adversely affected by environmental changes; notably temperature, pressure and chemical composition. These factors alter the velocity of acoustic propagation. For example, the velocity of sound in air at 0° is 1,087.42 fps, whereas in carbon dioxide it is 1,106 fps (feet per second). When a meter is installed in an environment in which the chemical nature of the gaseous medium undergoes change, this factor will disturb the level reading unless means are provided to compensate or correct therefor. Similarly, changes in the temperature of the medium or in ambient pressure adversely affects the accuracy of the instrument.

In my prior U.S. Pat. No. 4,470,299 (Soltz), compensation for environmental changes is effected by a reflector fixedly positioned to intercept and reflect energy from a side portion of the radiation field pattern of the transmitted beam to produce a reference echo signal which in no way interferes with the main liquid level echo signal derived from transmitted energy in a path normal to the surface of the liquid.

In the system disclosed in my prior '299 patent, the transducer is excited to emit periodic pulses which are directed along a center path toward the liquid surface and reflected to produce liquid echo pulses which return to the transducer and are detected thereby. The reference reflector which is placed at a predetermined position relative to the transducer intercepts energy from a side path in the radiation pattern of the transducer to return it to the transducer to produce reference echo pulses. Means are provided to determine the transit time along the center path and along the side path. The ratio of the reference side path and center path transit times is computed to provide an output representing the level of liquid independent of changes in the gaseous environment.

In prior art ultrasonic meters such as those disclosed in the Tankin U.S. Pat. No. 3,090,224 and the Kohno U.S. Pat. No. 4,183,244, use is made of an automatic gain control circuit in conjunction with the received signals. Automatic gain is generally effected by a control circuit adapted to automatically modify the amplification gain of a receiver in a manner whereby the desired output signal remains at a constant amplitude despite variations in input signal strength.

In an ultrasonic echo-ranging liquid level meter, variations in the amplitude of the echo pulses received from the surface of the liquid are encountered by reason of changes in this surface as well as changes in distance due to liquid level changes. Thus an echo pulse which has a long distance to travel before reaching the transducer will be weaker than an echo pulse traveling a shorter distance.

But in the context of an echo-ranging system of the type disclosed in my prior patent '299 in which reference echo pulses as well as liquid level echo pulses are received, at first blush it would appear that no need exists for automatic gain control with respect to the reference echo pulses. Because these pulses are derived from a reflector having a smooth surface placed a fixed distance from the transducer, all reference echo pulses should have the same strength.

However, typical ultrasonic transducers of the same model, though seemingly alike, nevertheless differ somewhat in sensitivity and exhibit a wide spread in echo response. Thus when manufacturing ultrasonic echo-ranging instruments, all of which incorporate the same model of transducer, it becomes necessary to make an individual gain setting to match a particular transducer to the instrument.

Hence in an environmentally-compensated ultrasonic instrument of the type disclosed in my prior '299 patent in which reference as well as liquid level echo pulses are received, actually two automatic gain control functions are needed: one for the reference echo pulses, and the other for the liquid level pulses.

To obviate the need for two automatic gain control circuits in an instrument of the type disclosed in my prior '299 patent, my subsequent U.S. Pat. No. 4,578,997 (Soltz), makes use of a single automatic gain control circuit that is time shared to effect separate gain control for operation in the reference mode and in the liquid level or target mode. In the arrangement disclosed in my '997 patent, the AGC is enabled in a reference mode during a time slot or window having a predetermined duration to effect gain control for the reference echo pulses, and the AGC is thereafter similarly enabled in the target mode to effect gain control for the liquid echo pulses.

The problem to which the present invention is addressed concerns parasitic echo pulses originating from reflecting surfaces other than the liquid surface, such as walls, pipes, brackets and other objects in the vicinity of the open channel or tank containing the liquid whose level is being ultrasonically metered. Thus when the liquid is contained in a tank having a flat top, should the liquid surface be wavy or turbulent rather than smooth and mirror-like, then transmitted pulses striking this liquid surface will not result solely in echo pulses which are returned to the transducer.

Some of the ultrasonic energy incident to the uneven liquid surface, instead of being directly reflected back to the transducer may be diverted or deflected toward the tank top at a site thereon displaced from the transducer and be bounced back from this site toward the reflective liquid surface from which it will be directed toward the transducer. Hence the round trip transit time of the diverted ultrasonic energy is not a function of the straight line distance between the transducer and the liquid surface and is not an index to the level of liquid in the tank.

In this specification, echo pulses which arrive at the transducer directly from the liquid surface are designated "main echo pulses," and those which come by way of an ultrasonically-reflective surface above the tank or other ultrasonically reflective obstacles are designated "parasitic echo pulses," both types of echoes being intercepted by the same transducer. Should the main echo pulses picked up by the transducer be relatively strong, the meter will disregard the parasitic echo pulses and its output reading will accurately represent liquid level. But if the main echo pulses are weak—and this depends on how much of the transmitted ultrasonic energy incident to the liquid level is returned directly to the transducer as against the portion diverted to produce parasitic echoes—then the parasitic echo pulses might be accepted as true echo pulses, thereby producing erroneous liquid level readings or output "spikes."

While it has heretofore been known to employ severe filtering and averaging techniques to discriminate against parasitic echo pulses, such expedients act to slow down the response time of the meter to changes in liquid level. This slowdown is not tolerable where a rapid response is required, as is usually the case.

It is also known to take spikes out of ultrasonic liquid level measurements in open-channel meters in a situation in which secondary echoes are derived from the transducer face itself. This is disclosed in the article "Taking the Spikes out of Ultrasonic Flow Measurement" by Daniel J. Soltz that appeared in the March 1984 issue of Pollution Engineering.

In the problem dealt with in this article, only secondary echoes outside of the measurement (i.e., time) span were found troublesome and easily rejectable. However, the present invention is especially concerned with an ultrasonic liquid level measuring system for tank disposed below an ultrasonically reflective ceiling or with other installations which give rise to parasitic echo pulses well within the measured span. These parasitic echo pulses cannot be rejected in the manner set forth in this article.

SUMMARY OF INVENTION

In view of the foregoing, the main object of this invention is to provide an ultrasonic echo-ranging meter for measuring the changing level of liquid in a tank of open channel, the meter including means to reject parasitic echo pulses without appreciably slowing down the response time of the meter to actual liquid level changes.

More particularly, an object of this invention is to provide in a meter of this type a microcomputer which is programmed to distinguish between true level change echo pulses and parasitic echo pulses.

Yet another object of this invention is to provide a parasitic echo pulse rejector which operates reliably and efficiently.

Briefly stated, these objects are attained in an ultrasonic echo-ranging meter for measuring the changing level of liquid in a tank or open channel, the meter including a transducer at a raised position above the liquid surface. Pulses of ultrasonic energy transmitted by the transducer are directed toward the liquid surface and reflected thereby to produce main echo pulses that are picked up by the same transducer. The round trip transit time of the pulse energy in the gaseous medium above the liquid depends on the distance between the transducer and the liquid surface, this time being measured to provide a reading of liquid level. Also intercepted by the transducer are parasitic echo pulses originating from reflecting wall surfaces and other obstacles in the vicinity of the tank or channel, which parasitic pulses may be confused with the main echo pulses and result in an erroneous reading. In order to reject these parasitic pulses without appreciably slowing down the response time of the meter to liquid level changes, means are provided that discriminate between parasitic and main echo pulses and act to render the meter insensitive to parasitic pulses.

Parasitic echo pulse rejection is carried out by comparing via computer software each new echo level reading related to the hardware count with the present average liquid level value, and accepting this new reading when the difference therebetween lies within a given acceptable margin. Readings outside this margin may be based on parasitic echoes or reflect a valid level change; hence discrimination therebetween is essential to avoid an erroneous reading. If new outside margin readings occur consecutively for a predetermined large number of times, say, 50 times, these are accepted as a true level change; hence all subsequent new outside margin readings only have to occur consecutively for a predetermined small number of times, say, four times, to be accepted as non-parasitic. Any new reading that lies within the margin will automatically reset the outside margin count, and another 50 consecutive outside margin readings are then required to be accepted. Those outside margin readings that fail to meet the consecutive test requirements are rejected and do not affect the output readings.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a block diagram of an ultrasonic liquid level echo-ranging measuring system in accordance with the invention; and FIG. 2 illustrates the computer program for rejecting parasitic echo pulses.

DESCRIPTION OF INVENTION

Referring now to FIG. 1, there is shown an open trough or channel 10 through which liquid 11 flows, the measuring system in accordance with the invention serving to measure the level H of liquid in the channel. By placing a dam in the channel, the level of liquid attained downstream of the dam will depend on flow rate; hence by measuring this liquid level one can also determine the flowrate. In practice, instead of an open channel the liquid whose level is to be measured may be that held in a process tank or other container. Consequently the atmosphere above the surface of the liquid is not necessarily pure air and may include ammonia, carbon dioxide and other gases.

Mounted at a raised position above channel 10 at a station having a fixed distance Z from the bottom of the channel is an ultrasonic transducer 13. This may take the form of a piezoelectric transducer, a ceramic electrostatic unit or any other element capable of generating ultrasonic energy of adequate strength. The straight line distance B between the face of transducer 13 and the surface 12 of the liquid depends on the varying level H of the liquid. Thus the value of Z is constant, whereas the relative values of H and B vary but always add up to value Z.

The field radiation pattern produced by an ultrasonic transducer is related to the ratio of the transducer's ultrasonic wavelength to its diameter. Thus a large diameter-to-wavelength ratio produces a relatively narrow field pattern and a small ratio, a broad field pattern.

The field pattern produced by transducer 13 includes a center beam path which extends vertically from the transducer face to the surface of the liquid and is normal thereto. The center beam path represents the shortest straight line distance between transducer 13 and liquid surface 12, for all other paths in the radiation field pattern more or less diverge from normal and represent progressively longer distances.

Placed at a fixed distance from transducer 13 at a position to intercept a side path of energy in the radiation pattern is a reflector 14. The reflector produces a reference echo pulse that is returned to the transducer, its time of transit being a function of the distance of the reflector from the transducer and of the velocity of sound in the gaseous medium.

Transducer 13 is excited periodically by a transmitter 15, causing the transducer to emit periodic pulses of ultrasonic energy in the desired field pattern. The transmitted energy is propagated through the gaseous medium between the transducer and the liquid surface and it is directed toward surface 12 where it is reflected and returned to the transducer which now acts as an ultrasonic detector whose output is coupled to a receiver 16. In practice, a limiting diode may be provided to protect receiver 16 from transducer 13 when it is being excited.

Each transmitted pulse is first followed in time by a reference echo pulse, for the reference distance from the transducer is shorter than the distance to the liquid surface. The reference echo pulse is followed by a liquid level or main echo pulse which is received over the center path, the shortest distance to the liquid surface. Actually, the system alternates between two modes; namely, reference and target. Each mode includes many consecutive transmit-receive cycles which are needed to establish an average value that corresponds to the particular mode.

The counter DC associated with a microcomputer 17 determines the transit time of ultrasonic pulse energy in its round trip from transducer 13 to the liquid surface target and the transit time in its round trip from the transducer to the reference point. This operation is set forth in detail in my prior '299 patent and will therefore not be repeated. The counts representing the liquid target transit time and the reference transit time are applied to microcomputer 17 which determines the ratio of the reference and target transit times to yield an output count representing liquid level independent of the environmental changes.

In the arrangement shown in FIG. 1, an automatic gain control amplifier 18 is interposed between transducer 13 and receiver 16, this circuit being enabled by microcomputer 17, which also controls the operation of transmitter 15. In the reference mode, the AGC amplifier is enabled only during time slot or windows corresponding to the reference mode during which a reference echo pulse is received. During target mode, the AGC amplifier is enabled during time windows corresponding to the target mode during which a liquid level echo pulse is received. The microcomputer is programmed to provide enabling signals to the AGC to establish these two time windows, the operation being disclosed in greater detail in the above-identified Soltz patents.

The system shown in FIG. 1 which includes a side reflector to produce reference echo pulses is of the type described in the above-identified Soltz patents. However, the problem of parasitic echo pulses does not arise only in system of this type but it exists in other types of ultrasonic liquid level meters in which the round-trip transit time of the pulse energy from the transducer to the liquid surface and back to the transducer is measured. The present invention is applicable to any known type of ultrasonic liquid level measuring system.

To illustrate this problem, transducer 13 is shown mounted below a ceiling 19 in a region having a stone wall 20, both obstacles being somewhat reflective to ultrasonic energy and being disposed in the vicinity of channel 10. It will also be seen in FIG. 1 that the surface 12 of the liquid is wavy, so that some of the ultrasonic energy striking liquid surface 12 is deflected, and instead of returning to transducer 13 is directed, as shown in broken lines, to ceiling 19, from which, as indicated by the arrows, it is reflected toward liquid surface 12 and is directed from this surface toward transducer 13. This multiple reflection situation represents one source of parasitic echo pulses.

And because the transmitted beam pattern has a side path, some of this side path energy, as indicated by dashed lines, strikes the surface of rough wall 20 and is reflected back to the transducer, this being another source of parasitic echo pulses. Thus what transducer 13 picks up in its receiving mode are not only main echo pulses from the liquid surfaces, but parasitic echo pulses from reflecting obstacles other than the liquid surface.

Microcomputer 17 initiates a level measurement cycle with a transmit signal which actuates transmitter 15 to drive transducer 13. It then waits for a received echo as described in the above-identified Soltz patents. The distance counter DC, which is a hardware counter, usually an integral part of microcomputer 17, serves as a distance counter by counting the elapsed time from the instant a main pulse is transmitted to the instant the first echo pulse is detected. The main echo pulse from the liquid surface is normally the strongest echo that effects the gain of AGC amplifier 18 so that parasitic echoes from obstacles such as ceiling 19 and wall 21 are masked. However, as pointed out previously, the main echo pulses may be weak because a significant portion of the ultrasonic energy striking the wavy liquid surface is deflected.

In order to reject these parasitic echoes and avoid erroneous output readings, the microcomputer 17 includes a parasitic decrement echo counter PEC whose operation is governed by the computer program illustrated in FIG. 2.

Every new distance reading, as shown in FIG. 2, is translated into a new level value N to find out whether value N is based on target echoes from the liquid surface whose level is being metered or from parasitic echoes. The present running average level designated P is subtracted from the new level value N to yield an absolute deviation value D. When the value of D is smaller than a predetermined acceptable deviation margin M, this indicates a correct target echo that will be included in the update of the present running average level P. It also causes initialization of parasitic echo counter PEC to 50 or whatever other predetermined large number is found appropriate for purposes of determining whether or not to reject.

On the other hand, larger deviations ($D \geq M$) are first assumed to be caused by parasitic echoes, although conceivably they could represent a true level change. Each such reading decrements counter PEC by one and is rejected; that is, it is not included in the update of the present average level P. However, fifty consecutive parasitic echoes are no longer viewed as parasitic but rather as true liquid level changes.

Consequently, the fiftieth reading is accepted and the PEC counter is then initialized to 4 (or another predetermined small number)., which means that only four outside margin consecutive echoes are now needed in order to have the fourth one accepted. Any new reading within the established margin is, of course, acceptable, and counter PEC is initialized back to 50. Hence from here on, another fifty consecutive outside margin readings are needed to be treated as a valid liquid level change.

One must bear in mind that parasitic echoes are more likely to be random, whereas target echoes representing a valid liquid level change are consistent. Thus the system is able to distinguish between target and parasitic echoes and respond accordingly. All level changes that take place between two adjacent readings that are within the allowed margin M are always accepted.

In summary, in a parasitic echo rejector in accordance with the invention, each new echo level reading related to the hardware count provided by counter DC is compared with the present average liquid level value and this new reading is accepted by the system when the difference therebetween lies within a given acceptable margin.

Since readings outside of this acceptable margin may be based on parasitic echoes or reflect a valid level change, discrimination therebetween is essential to avoid an erroneous reading. In order to effect such discrimination, new outside margin readings, should they occur consecutively a predetermined large number of times, such as 50 times, are accepted as true level changes, in which case all subsequent new outside margin readings only have to occur for a predetermined small number of consecutive times (i.e., 4) to be accepted as non-parasitic.

Any new reading that lies within the margin will automatically reset the outside margin count, and another 50 consecutive outside margin readings are then required to be accepted. Those outside margin readings that fail to meet the consecutive test requirements are rejected and do not effect the output readings.

While there has been shown and described a preferred embodiment of a parasitic echo pulse rejector for ultrasonic liquid level meter in accordance with the invention, it will be appreciated that many changes and modifications may be made therein without, however, departing from the essential spirit thereof.

I claim:

1. An ultrasonic echo-ranging system to measure within a predetermined time span the level of liquid in an open channel or tank, said system comprising:

A an ultrasonic transducer disposed on an ultrasonically-reflective surface at a fixed raised position above the surface of the liquid;

B means to excite the transducer to emit periodic pulses of ultrasonic energy which are propagated in a gaseous medium between the transducer and the liquid and are directed toward the surface of the liquid and reflected from this target to produce main echo pulses which return to the transducer and are detected thereby, said transducer also detecting parasitic echo pulses originating from said ultrasonically-reflective surface;

C means including a programmed microcomputer and a distance counter responsive to pulses detected by the transducer to measure the round trip transit time of the pulse energy in the gaseous medium to provide a reading of liquid level; and D a parasitic echo rejector operatively coupled to said microcomputer acting to discriminate between said main echo pulses and said parasitic pulses received within said span to render said system non-responsive to said parasitic pulses to provide an accurate reading of liquid level.

2. A system as set forth in claim 1, further including a receiver coupled to said transducer to receive the pulses detected thereby and to apply them to said microcomputer.

3. A system as set forth in claim 2, further including an automatic gain amplifier interposed between said transducer and said receiver and responsive only to main echo pulses when the strength thereof is greater than the parasitic echo pulses.

4. A system as set forth in claim 1, wherein said rejector includes a parasitic echo counter.

5. A system as set forth in claim 4, wherein said microcomputer is programmed so that each new echo level reading related to the count provided by said distance counter is compared with the present liquid level value, and this new reading is accepted by the system when the difference therebetween lies within a given acceptable margin.

6. A system as set forth in claim 5, in which readings outside of said acceptable margin may be based on parasitic echoes or reflect a valid level change, discrimination therebetween being effected by determining whether new outside margin readings occur consecutively a predetermined large number of times, in which event they are accepted as true level changes.

7. A system as set forth in claim 6, wherein said large number of times is 50.

8. A system as set forth in claim 6, wherein if outside margin readings occur consecutively said large number of times and are accepted, all subsequent new outside margin readings have only to occur for a predetermined small number of consecutive times to be accepted as non-parasitic.

9. A system as set forth in claim 8, wherein said small number is 4 times.

* * * * *